United States Patent Office.

WILLIAM P. THURBER, OF CHICAGO, ILLINOIS.

Letters Patent No. 76,555, dated April 7, 1868.

IMPROVED MEDICAL COMPOUND.

The Schedule referred to in these Letters Patent and making part of the same.

Be it known that I, WILLIAM P. THURBER, of the city of Chicago, in the county of Cook, in the State of Illinois, have invented a new and improved Cure for Coughs, Colds, Catarrhs, Asthma, and Diseases of the Pulmonary Organs; and I do hereby declare that the following is a full and true description thereof.

The nature of my invention consists in providing a remedy for coughs, colds, catarrhs, asthma, and diseases of a pulmonary nature, with the following ingredients:

Prepared sugar sirup, tincture of lobelia, hoarhound, paragoric, and tartar-emetic. The sugar sirup makes the mixture palatable, the tincture of lobelia expands the lungs, opens the pores, and detaches the slough or matter that causes the particular disease, the hoarhound heals the affected parts, and the paragoric and tartar-emetic assist the removal and expectoration of the matter.

In preparing my mixture, I use the foregoing ingredients in the following quantities:

One quart of prepared sugar sirup, six ounces of tincture lobelia, two ounces of paragoric, two drachms of extract of hoarhound, thirty grains of tartar-emetic, or in quantities in a like ratio, all mixed together.

What I claim as my invention, is—

The improved medicine prepared of the material and substantially as herein set forth.

WM. P. THURBER.

Witnesses:
WM. E. COWPER,
JAMES H. GILBERT.